Dec. 27, 1949    M. LICHTEN    2,492,230
FOLDING SERVICE TRAY FOR VEHICLES
Filed Nov. 10, 1947    2 Sheets-Sheet 1
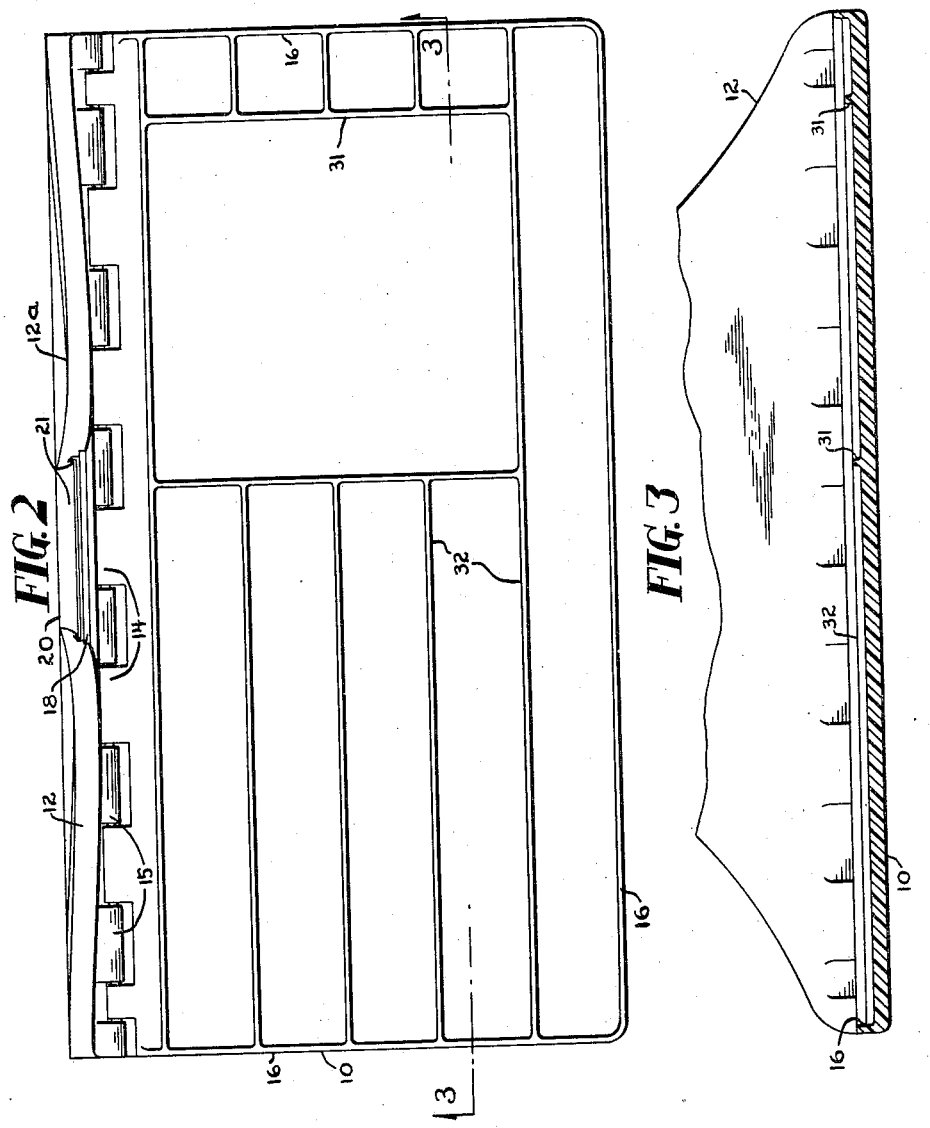
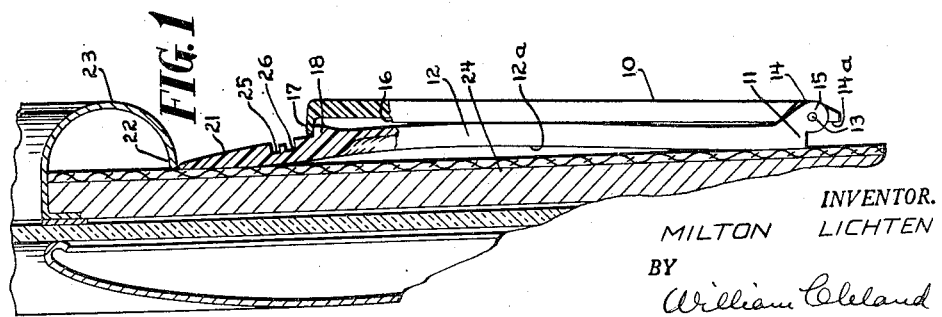
INVENTOR.
MILTON LICHTEN
BY William Cleland
Attorney Dec. 27, 1949   M. LICHTEN   2,492,230
FOLDING SERVICE TRAY FOR VEHICLES
Filed Nov. 10, 1947   2 Sheets-Sheet 2
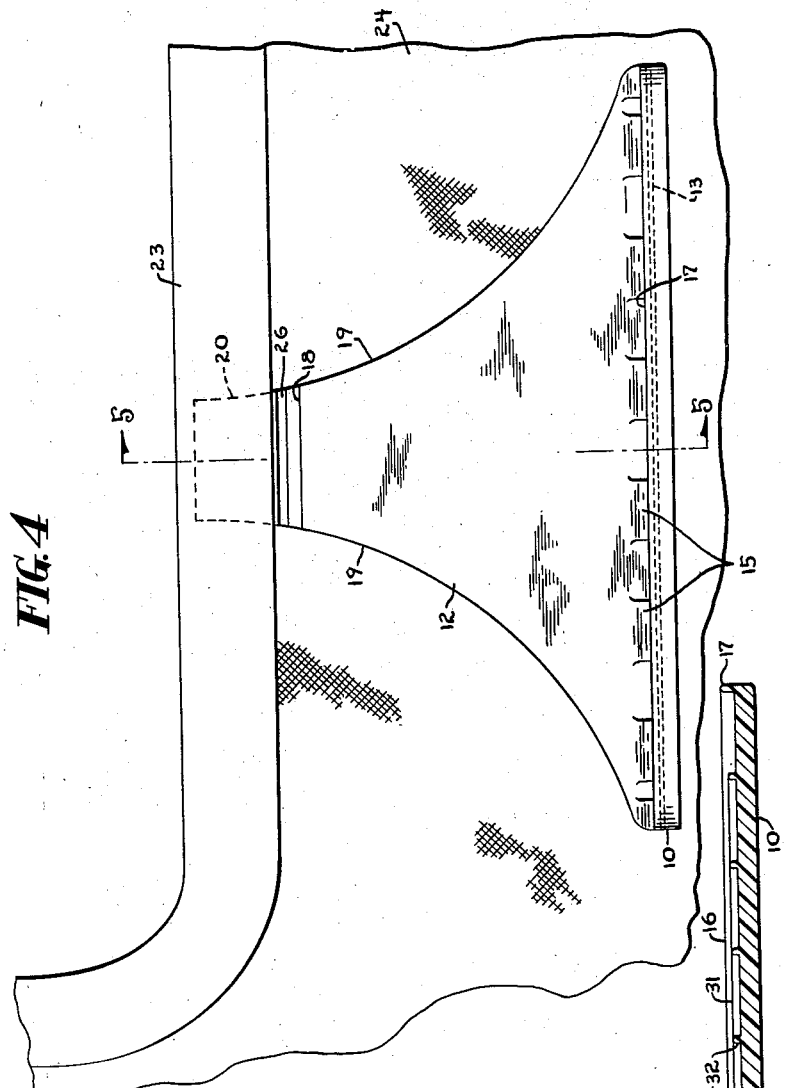
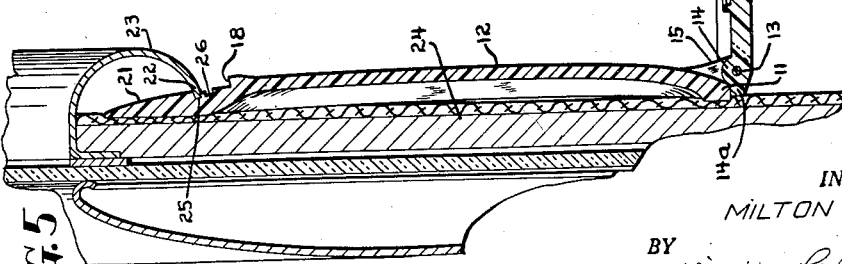
INVENTOR.
MILTON LICHTEN
BY William Cleland
Attorney Patented Dec. 27, 1949

2,492,230

UNITED STATES PATENT OFFICE 2,492,230

FOLDING SERVICE TRAY FOR VEHICLES

Milton Lichten, Akron, Ohio

Application November 10, 1947, Serial No. 784,972

5 Claims. (Cl. 311—21)

This invention relates to a service tray device, particularly for use in automobiles to support refreshments such as are served at roadside stands.

Heretofore there have been provided tray devices which were temporarily attached to a vehicle in various ways, but these have been objectionable as often being necessarily attachable only at inconvenient heights or locations, and as requiring to be attached and removed at each time of use. Other known devices have been objectionable as being either too expensive to manufacture or too inconvenient to install or operate, or because of interference with normal use of the vehicle.

One object of the present invention is to provide an improved service tray device for vehicles, which is quickly and easily attachable in convenient position for use, utilizing the usual metal trim strips provided in vehicles, and without requiring special tools or additional fastening means, such as screws.

Another object of the invention is to provide a simple, compact, service tray device of the character described which may be firmly attached in the vehicle to be a permanent accessory thereof, and which is easily foldable to an out of the way position when not in use, the device being particularly adapted to be neat and attractive in either the extended or the folded positions thereof.

These and other objects of the invention will be manifest from the following brief description and the accompanying drawings.

Of the accompanying drawings:

Figure 1 is an end elevational view of a closed or folded service tray device embodying the features of the invention, the same being partly broken away and in section and being illustrated in position for initial insertion under an interior trim strip of a vehicle.

Figure 2 is a top plan view of the device of Figure 1, but in open position with the tray extended.

Figure 3 is a cross-section partly broken away, taken substantially on the line 3—3 of Figure 2.

Figure 4 is a front elevational view of the tray device attached to the interior door trim strip of the vehicle, and illustrating the tray in open or extended position for use.

Figure 5 is a cross-section taken substantially on the line 5—5 of Figure 4.

For convenience, the parts of the tray device are herein described and located with reference to the vehicle in which it is to be installed.

Referring to the drawings, the numeral 10 designates a relatively small, generally oblong tray, hingedly connected at one edge thereof to the bottom edge 11 of a normally vertical backing member 12, by means of an elongated hinge pin 13 received through interfitting spaced lugs 14, 14 and 15, 15 on the tray and backing member, respectively. The lugs 14 and 15 are arranged so that the hinge pin center is inwardly of the inner face of the backing member and below said bottom edge 11 thereof, to permit engagement of integral projections or extensions 14a from the lugs 14 with the bottom edge portions 11 of the backing member, thereby to limit downward swinging movement of the tray beyond desired horizontal position of use thereof, as shown in Figures 2, 3, 4 and 5. Both the tray and the backing member may be of molded synthetic plastic resin material, either opaque, transparent or translucent, and in attractive colors, or color combinations; or both parts may be of metal, wood, or other suitable material.

The tray 10 is shown as having upwardly projecting reinforcing ribs 16, 16 and 17 along the side and front edges thereof, respectively, as considered in said open position. For releasably locking the tray in the closed position of Figure 1, the front rib 17 is engageable with a suitably angled, upwardly presented shoulder 18, integrally formed on the inner face of member 12, against the inherent resiliency of the material of the tray and member.

Curved sides 19, 19 of backing member 12 converge upwardly from the extreme ends of bottom edge portion 11 thereof, to provide a relatively narrow tang or top portion 20, the inner face of which is chamfered or wedge-shaped at 21 to be readily forcibly insertable upwardly between the bottom edge 22 of a hollow, bead-shaped, metal trim strip 23 of the usual passenger automobile, for example, and the inner surface of the usual fabric covered panel 24 thereof, until said edge portion 22 of the strip yieldingly engages snugly within a slot 25 firmly to clamp the device in place. The length of the slot 25, though short, is sufficient that snug engagement of the trim strip edge 22 therein will prevent tilting of the tray 10 when loaded with refreshments, for example.

The above-described clamping and non-tilting support of the tray device will be substantially enhanced by the backing member 12 being molded or otherwise preformed vertically and inwardly arched or bowed, to have a concave side 12a against vehicle panel 24, as shown in Figure 1. Thus, when the tray device is urged to the fully supported position of Figure 5, the pressure of the trim strip will tend to flatten the backing member against the inherent tendency thereof to resume its normal curved shape. Moreover, as some curvature is retained in the backing member, the relatively soft or yielding fabric of the panel 24 will be compressed into said concavity 12a further to prevent tilting of the tray device. This helps to make possible the provision of the relatively narrow tang 20, whereby in turn is made possible snug interfitting of the trim-strip edge portion 22 in slot 25, regardless of irregularities in said edge portions along substantial lengths thereof. At least one additional laterally extending slot 26 may be provided in the backing member, in spaced relation to slot 25 and of an increased width, for receiving the bottom edge portion of a heavier trim-strip 23.

The upper face of the tray 10 may be suitably ribbed, as best shown at 32, 32 in Figures 2 and 3, further to reinforce the tray, as well as to provide non-skid retaining means, as for a drinking container (not shown) at 31, and a sandwich (not shown).

In use of the tray device described above, it is particularly adapted to be economically produced for quick attachment to any automobile or other vehicle having the usual hollow, bead-like trim strip, such as the trim strip 23 around the door window of the vehicle. No particular skill is required to apply the backing member 12 against the inner face of door panel 24, and simultaneously to apply yielding flattening pressure on the curvate member and upward pressure thereon, from the position thereof shown in Figure 1 to the attached position shown in Figures 1, 4 and 5, until the trim strip edge portion 22 is firmly engaged either in slot 25 or slot 26, against the yielding pressure of the trim strip and the inherent tendency of the flattened backing member to resume normal curvate shape. In some instances it may be necessary to spring the edge portion 22 of the strip 23 inwardly with a screwdriver or similar tool to start the wedge-shaped portion 20 toward its attached position, or to adjust the tension applied to the backing member. The tray device thus attached, and arranged in the open position of Figures 2, 3, 4 and 5, will support, for example, the usual sandwich and beverage container, or other items, supplied at roadside refreshment stands. When the tray 10 is not thus in use it is quickly foldable to unobtrusive closed position, as shown in Figure 1, and yieldingly retained in that position by locking engagement of rib 17 of tray 10 with shoulder 18 of backing member 12.

Modifications of the invention may be resorted to without departing from the spirit thereof or the scope of the appended claims.

What is claimed is:

1. A service tray device for vehicles which are provided with a horizontally extending hollow trim strip having a bottom edge portion turned outwardly toward an inner wall face of the vehicle and being of inherently resilient construction, said device comprising a vertical backing member and a tray extending horizontally therefrom, the upper end portion of said backing member being relatively thin and wedge-shaped in vertical cross-section for ready reception thereof upwardly between said wall face and said bottom edge portion of the trim strip yieldingly against the inherent resiliency thereof, said backing member having on the inwardly presented side thereof adjacent said upper portion a downwardly presented shoulder for engagement by said bottom edge portion of the trim strip to support the member and tray against the inner wall face.

2. A service tray device for vehicles provided with a longitudinally extending hollow trim strip having a bottom edge portion turned outwardly toward an inner wall face of the vehicle and being of inherently resilient construction, said device comprising a vertical backing member, and a tray hinged to the bottom edge thereof, said tray being swingable about the hinge between a horizontally extended position and a folded position against said backing member, interengageable stop portions being provided on said backing member and tray for retaining the tray in said horizontally extended position, the upper end portion of said backing member being relatively thin and wedge-shaped in vertical cross-section for ready reception thereof upwardly between said wall face and said bottom edge portion of the trim strip yieldingly against the inherent resiliency thereof, said backing member having an inwardly presented groove therein adjacent said upper end portion for yielding reception therein of the bottom edge of said trim strip for vertical support of the member.

3. A service tray device as set forth in claim 2, said tray and backing member having releasably interengageable latching portions thereon for retaining the tray in said folded position against the backing member.

4. A service tray device as set forth in claim 2, said backing member being of springy material and inwardly vertically arcuate to be yieldingly flattened by pressure of said yielding engagement with the trim strip.

5. A service tray device as set forth in claim 2, said backing member being substantially the lateral width of said tray at the bottom thereof and converging upwardly to relatively narrow width of said upper end portion, said tray and backing member having interengageable latching portions thereon for retaining the tray in said folded position against the member, said backing member being of springy material and inwardly vertically arcuate to be yieldingly flattened by pressure of wedging engagement with the trim strip.

MILTON LICHTEN.

REFERENCES CITED

The following references are of record in the file of this patent:

UNITED STATES PATENTS

| Number | Name | Date |
| --- | --- | --- |
| 1,152,677 | Warren | Sept. 7, 1915 |
| 1,308,066 | Hayes | July 1, 1919 |
| 1,571,753 | Christian | Feb. 2, 1926 |
| 1,630,889 | Clark | May 31, 1927 |
| 1,836,511 | Severns | Dec. 15, 1931 |
| 2,050,951 | Hundertmark | Aug. 11, 1936 |
| 2,207,667 | Holly | July 9, 1940 |